C. E. LONG.
FISHING ROD.
APPLICATION FILED NOV. 13, 1911.
1,073,260.
Patented Sept. 16, 1913.
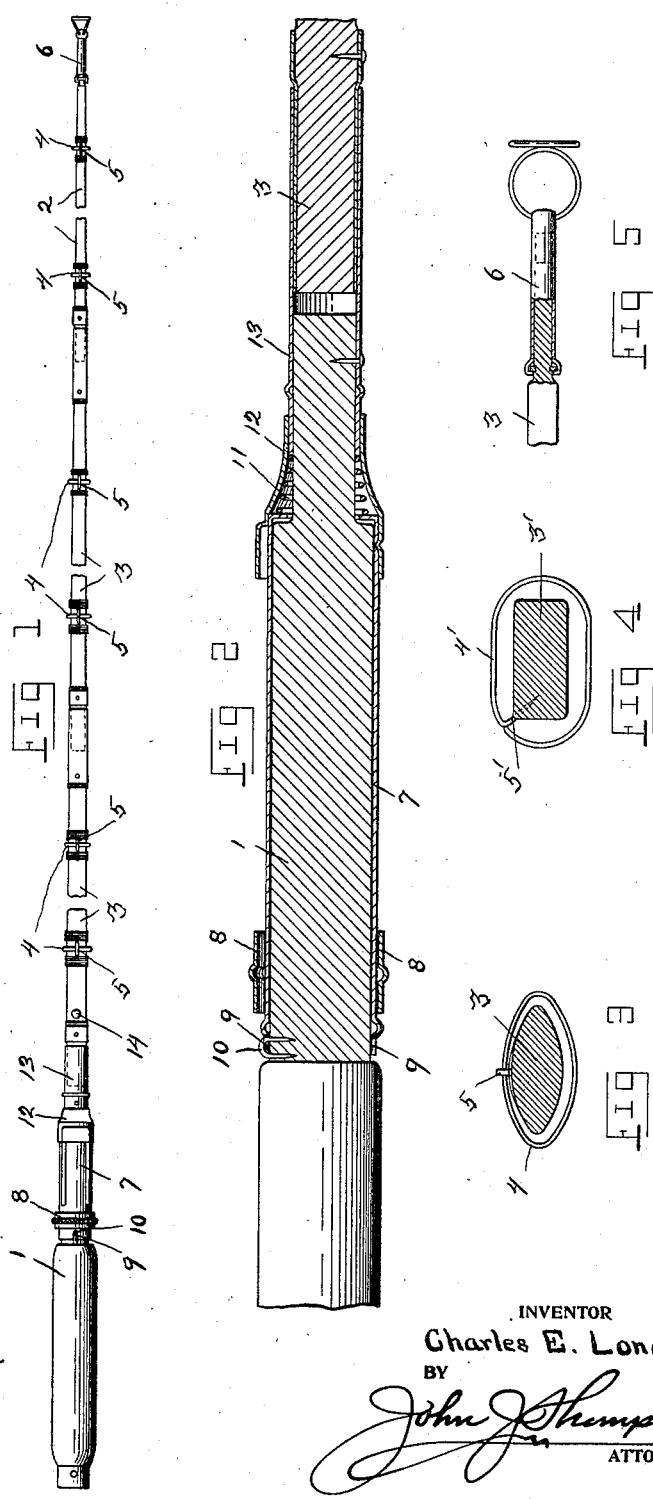
WITNESSES
B. P. Faltin
M. L. Lefevre
INVENTOR
Charles E. Long.
BY
John J. Thompson
ATTORNEY

UNITED STATES PATENT OFFICE.

CHARLES E. LONG, OF LANCASTER, PENNSYLVANIA.

FISHING-ROD.

1,073,260.　　　Specification of Letters Patent.　　Patented Sept. 16, 1913.

Application filed November 13, 1911. Serial No. 659,897.

*To all whom it may concern:*

Be it known that I, CHARLES E. LONG, a citizen of the United States, residing at Lancaster, in the county of Lancaster and State of Pennsylvania, have invented certain new and useful Improvements in Fishing-Rods, of which the following is a specification, reference being had therein to the accompanying drawing.

This invention relates to a fishing-rod and is equally adaptable to either a one piece or jointed rod, and the invention relates more particularly to a combined flexible and stiff rod; it having heretofore been necessary to have separate rods for this purpose.

The object of this invention is to provide a rod that shall be so constructed that without alteration or adjustment other than a turn of the wrist, may be instantly and while in use, converted from a flexible rod into a stiff rod as is employed in trout fishing when it is desired to change from fly to bait fishing.

Another object of the invention is to provide a fishing-rod in which the line and reel may be used upon any of its sides and will automatically adjust themselves as the rod is turned in the hand.

Still another object is to provide a fishing-rod that shall be cheap, durable, efficient and be capable of withstanding a much greater breaking strain when held in one position than when held in the other position.

With these and other objects in view, my invention consists in certain construction and combination of parts as will hereinafter be fully described and claimed in the annexed specification and illustrated in the accompanying drawings which form a part of this application and in which like figures of reference refer to corresponding parts in all of the views; but it is fully understood that while I have here described my invention as shown, that I do not confine myself to the exact design, as slight changes may be made in the construction and arrangement of the several parts without departing from the spirit of the invention.

In the drawings:—Figure 1, shows a fishing-rod embodying my invention. Fig. 2, is a partial view of the handle section shown in section. Fig. 3, is a cross section showing the shape of the rod. Fig. 4, is a cross section of a modified form and also shows another form of guide. Fig. 5, is a view of the swivel tip partly in section.

Referring to the drawings; the rod as here shown comprises hand section 1, tip section 2, and intermediate sections 3; but it is understood that the rod may be composed of one or more sections; all of which are in cross section, either of an oval form as shown in Fig. 3, rectangular, as shown in Fig. 4, or other forms in which one of its radii is greater than the other; the flexibility of the rod depending upon the proportions of said radii. The advantages and possibilities of this shaped rod will be readily seen as when the rod is held with its greatest diameter in a horizontal position, it will be very flexible, and when given a quarter turn to bring its greatest diameter in a vertical position, it will be rendered nearly rigid or stiff; these two qualities being of great value in certain kinds of fishing.

To accommodate the line as the rod is turned in the hand and prevent the same from becoming wrapped upon the rod, the line guides or keepers 4 which are in the form of rings which encircle the rod and are secured thereto by the staple 5, or other securing means, thus allowing the line to follow the lower surface of the rod when held in any position; and to carry out this idea, the end of the rod is provided with a swivel tip 6.

In the preferred form the line guides embody oval wire rings slightly larger than the rod, and secured thereto by staples which have their prongs bent at right angles to rest on the rod, the bent ends being wrapped with wire as indicated in Fig. 1. In Fig. 4, a modified form of guide is shown, which comprises a wire 4' bent to conform with the general shape of the rod 3', but slightly larger than it, the wire having its ends bent inward and sharpened to be forced into the rod as shown at 5', to securely fasten the guide.

The handle portion of the rod 1, is provided with a sleeve 7, which may be turned upon the handle in four or more positions, and to which the reel may be clamped in the usual way by the sliding ring 8. To retain said sleeve 7 in any one of its positions, the rear end of the same is provided with the notches 9, which engage a pin or stop 10, secured to the handle 1; the sleeve 7, being retained in a locked position by the tension of a spring 11, which embraces the reduced portion of the handle portion 1, bearing against an inturned shoulder formed on the sleeve 7, and the end of the ferrule 13, within the cap. A sleeve 12 embraces the ferrule 13 at one end and has its other end flared to embrace the end of the sleeve 7 adjacent the spring 11 to keep the latter in place and protect it from dust and dirt, and in this manner the reel may be used upon the upper side upon any position of the rod.

For quickly indicating which of the sides of said rod should be uppermost to render the rod flexible, the indicating mark 14, is provided.

Having thus described my invention what I claim as new and desire to secure by Letters Patent is:—

In a fishing rod of the class described, in combination with a rod having in cross section radii of different lengths, of line guides, each of said guides being formed of a single piece of wire encircling said rod, and having a staple formed on one end thereof and adapted to be inserted in the rod to hold the guides, whereby the rod may be turned to give a flexible or stiff rod, and the line will follow the lower surface of said rod, for a purpose that has been hereinbefore described.

In testimony whereof I affix my signature in presence of two witnesses.

CHARLES E. LONG.

Witnesses:
  M. E. Hurst,
  John J. Thompson.